United States Patent [19]

Staniland

[11] 4,113,698
[45] Sep. 12, 1978

[54] AROMATIC POLYMER PRODUCTION

[75] Inventor: Philip Anthony Staniland, Tewin Wood, England

[73] Assignee: Imperial Chemical Industries Limited, London, England

[21] Appl. No.: 767,333

[22] Filed: Feb. 10, 1977

[30] Foreign Application Priority Data

Feb. 10, 1976 [GB] United Kingdom ............... 5172/76

[51] Int. Cl.² ....................... C08G 65/40; C08G 75/20
[52] U.S. Cl. .................................. 528/481; 528/499; 528/125; 528/128; 528/218; 528/219; 528/174; 528/175
[58] Field of Search .................... 260/47 R, 50, 49, 61

[56] References Cited
U.S. PATENT DOCUMENTS 3,647,751 3/1972 Darsow .................................. 260/49
3,928,295 12/1975 Rose ................................ 210/79.3 M Primary Examiner—Lester L. Lee
Attorney, Agent, or Firm—Cushman, Darby & Cushman

[57] ABSTRACT

Process for the separation of a polyetherketone from the reaction product resulting from the nucleophilic polycondensation of (i) at least one alkali metal bisphenate with at least one dihalo compound, and/or (ii) at least one alkali metal halophenate, in an aromatic sulphone solvent of formula

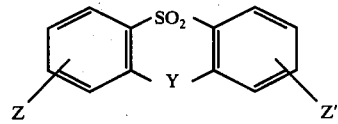

in which Y is a direct link, oxygen, or a pair of hydrogen atoms, and Z and Z' are hydrogen atoms or phenyl groups, comprising finely dividing the solidified reaction product, leaching out alkali metal halide with water and then heating the resultant finely divided material to a temperature of at least 200° C but below its melting point under a vacuum to remove the water and aromatic sulphone by distillation.

11 Claims, No Drawings

AROMATIC POLYMER PRODUCTION

This invention relates to aromatic polymer production and in particular to an improved process for the separation of an aromatic polymer from the reaction mixture wherein it is produced.

The aromatic polymers with which the present invention is concerned are polyethers containing phenylene groups linked by oxygen atoms and by ketone groups (and also, optionally, by direct linkages, e.g. so as to form biphenylylene groups and/or terphenylylene groups, and/or by sulphone groups not more than 25% of the combined total of ketone and sulphone groups being sulphone groups). Such polymers containing sulphone linkages are hereinafter termed aromatic etherketone/sulphone copolymers.

The etherketone polymers and etherketone/sulphone copolymers with which the present invention is concerned are produced by the polycondensation of at least one alkali metal bisphenate with at least one dihalo compound or by the polycondensation of an alkali metal halophenate. Examples of such processes are described in United Kingdom patent specifications Nos. 1 078 234, 1 153 527 and 1 414 421 and give an alkali metal halide as a byproduct of the polymerisation reaction.

Where the polymerisation reaction is conducted in solution, the product resulting from the reaction consists of the polymer in admixture with the polymerisation solvent and with the alkali metal halide.

It is therefore necessary to separate the polymer from the solvent and alkali metal halide.

It has been proposed hereinbefore, e.g. in United Kingdom Patent Specifications Nos. 1 078 234 and 1 153 527, to effect the separation by precipitation of polymer from the reaction mixture by addition of water and/or an organic solvent such as methanol.

An alternative method which utilised a polymerisation solvent of relatively high melting point, e.g. as described in United Kingdom Patent Specification No. 1 414 421, involved cooling the reaction mixture to obtain a solid product, comminuting this solid product and thereafter removing the alkali metal halide and polymerisation solvent by extraction with water and organic solvents such as acetone/methanol mixtures. These techniques require relatively costly solvent recovery steps. We have now devised an alternative polymer isolation system.

Accordingly we provide a process for the separation of an aromatic etherketone polymer or etherketone/sulphone copolymer from the reaction product resulting from the nucleophilic polycondensation of i) at least one alkali metal bisphenate with at least one dihalo compound, and/or ii) at least one alkali metal halophenate, in an aromatic sulphone solvent of formula

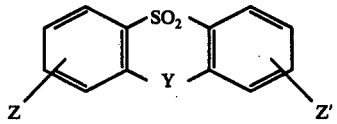

in which Y is a direct link, oxygen or a pair of hydrogen atoms (one attached to each benzene ring) and Z and Z', which may be the same or different, are hydrogen atoms or phenyl groups, comprising cooling the reaction product from the polymerisation temperature until the reaction product has solidified, finely dividing the reaction product, leaching out the alkali metal halide with water and then heating the resultant finely divided material to a temperature of at least 200° C, but below the melting point of the material, under reduced pressure to distil off any remaining water and the aromatic sulphone solvent.

Preferred etherketone polymers and etherketone/sulphone copolymers that may be employed are those resulting from the nucleophilic polycondensation of a) at least one alkali metal halophenate of the formula

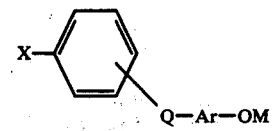

in which Ar is a divalent aromatic radical such as phenylene, biphenylylene, terphenylylene or a radical of formula

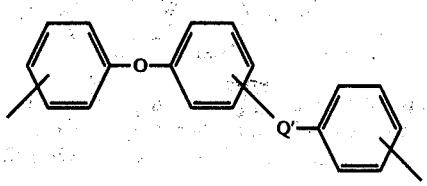

and/or b) a mixture of 49-50% molar of at least one alkali metal bisphenate of formula

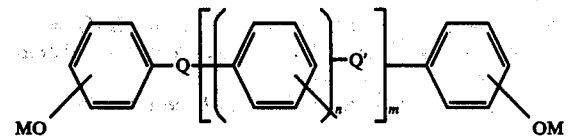

or

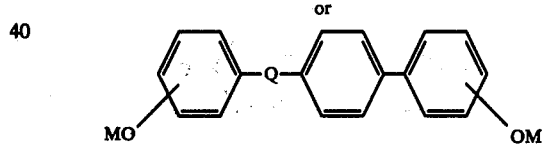

and correspondingly 51-50% molar of at least one dihalo compound of formula

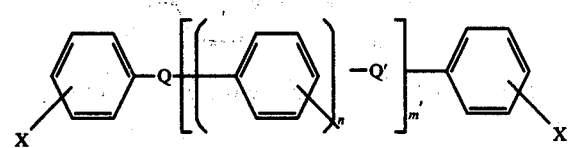

wherein X is halogen and is ortho or para, preferably the latter, to the groups Q, M is alkali metal and at least 95% of the OM groups are in the para position, Q (and Q' if present) is selected from —SO₂— or —CO—, at least 75% of the groups Q and Q' being —CO—, $n$ and $n'$ are positive integers not exceeding 3, and $m$ and $m'$ are each 0, 1, 2 or 3.

No more than 25% of the total number Q and Q' groups should be —SO₂— since such polymers are less crystalline and hence of lesser utility. Increasing the sulphone group content also decreases the melting point of the polymer and at relatively high sulphone group contents, the reaction product may tend to soften and agglomerate during the step of removal of the aromatic sulphone by distillation.

The polymerisation is conveniently conducted by the procedure described in aforesaid United Kingdom Patent Specification No. 1 414 421. The halogen atoms are preferably fluorine or chlorine, preferably the latter, and the alkali metal sodium or potassium, preferably the latter.

Preferred halophenates are those of the formula

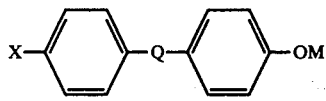

[the preparation and polymerisation of which are described in United Kingdom Patent Specification Nos. 1 153 035 (Q = SO$_2$) and 1 153 527 (Q = CO)]

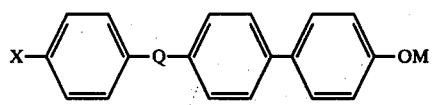

[the preparation and polymerisation of which are described in United Kingdom Patent Specifications Nos. 1 390 918 (Q = CO) and 1 298 821 and 1 298 822 (Q = SO$_2$)] and

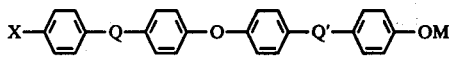

[the preparation and polymerisation of which (Q = Q' = —CO—) is described in United Kingdom Patent Specification No. 1 415 011].

Preferred bisphenates are those of the formula

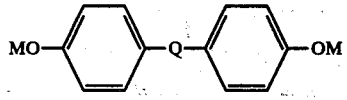

particularly

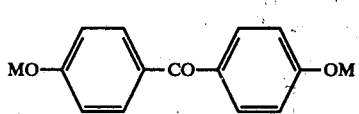

while preferred dihalo compounds are those of the formula

We particularly prefer to use a substantially equimolar mixture of (i) a) at least one ketone link containing dihalo compound selected from 1,4-bis-(4-halobenzoyl) benzenes and 4,4'-dihalobenzophenones alone or in admixture with b) a 4,4'-dihalodiphenylsulphone and (ii) a dialkali metal salt of 4,4'-dihydroxybenzophenone.

The aromatic sulphone solvent is preferably diphenyl sulphone although others that may be used include dibenzothiophen dioxide, phenoxathiin dioxide and 4-phenylsulphonyl biphenyl.

The polymerisation is generally conducted at a temperature of 250–400° C and, after termination of the reaction, e.g. by the addition of a chain terminator such as methyl chloride, 4,4'-dichlorodiphenyl sulphone or 1-benzenesulphonyl-4-chlorobenzene, the reaction mixture is cooled. The polymer generally has a poor solubility in the aromatic sulphone solvent at temperatures below the polymerisation temperature range and so, on cooling the reaction mixture, it crystallises or is precipitated (together with the alkali metal halide byproduct which is generally insoluble in the aromatic sulphone solvent.) On cooling further, the reaction product solidifies. Typically the reaction product will contain about 50% by weight of the aromatic sulphone solvent, 37% by weight of polymer and 13% by weight of alkali metal halide.

The solidified reaction product is then finely divided, e.g. by milling to a particle size preferably less than 500 μm and washed with water whereupon the alkali metal halide is leached out. A plurality of water washes may be employed. The number and duration of the washes will of course depend upon the desired residual alkali metal halide level in the polymer.

The resultant finely divided material is then separated from the water, e.g. by filtration and then heated, while being agitated, in a vacuum vessel. The temperature is progressively raised to above 200° C (but below the melting point) - preferably to between 200° C and 300° C while a vacuum is applied to cause the aromatic sulphone to distil off. It will be appreciated that the temperature required will depend on the degree of vacuum applied and the volatility of the aromatic sulphone. The vacuum applied is conveniently between 1 and 10 mm of mercury.

The aromatic sulphone removed by distillation can be collected and reused as a polymerisation solvent, with an intermediate purification step if necessary.

The polymer isolated by the above technique is a dry powder, generally of higher bulk density than is achieved by alternative isolation routes.

The invention is illustrated by the following example.

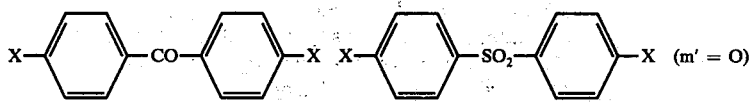

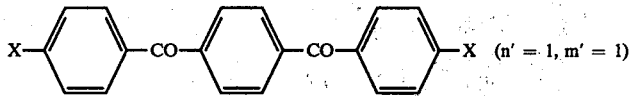

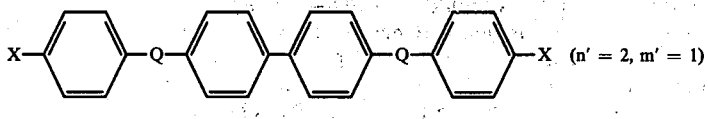

EXAMPLE 1

An etherketone/sulphone copolymer was produced by the procedure of British Patent Specification No. 1 414 421 by the polycondensation of the dipotassium salt of 4,4'-dihydroxybenzophenone with an approximately equimolar amount of a mixture of 4,4'-dichlorobenzophenone and a minor proportion of 4,4'-dichlorodiphenylsulphone. The polymerisation solvent was diphenyl sulphone. Approximately 10% of the —CO— and —SO$_2$— groups in the copolymer were —SO$_2$— groups.

The reaction product comprised 35% by weight of copolymer, 12.5% by weight of potassium chloride, and 52.5% by weight diphenyl sulphone.

The reaction product was cooled from the reaction temperature to room temperature and the resulting solid milled to pass through a 500 μm sieve.

100 g of the milled reaction product was given five washes with water (1 liter at 80° C) each lasting 10 minutes and then six washes (1 liter at 80° C) each lasting one hour. The fourth of these six washes was with a 1% by weight aqueous acetic acid solution, while the other five were with water.

The moist solid residue was transferred to a flask equipped for vacuum distillation and stirring. The flask was immersed in silicone oil at 100° C and the pressure then reduced to 5 mm of mercury. During this step the residual moisture was distilled off. While stirring, the temperature was increased to 200° C whereupon diphenyl sulphone began to be distilled off. Over a period of one hour the temperature was gradually raised to 300° C at which point distillation of diphenyl sulphone had apparently ceased. At no time did the temperature exceed the melting point of the finely divided material.

The flask was cooled and the pressure restored to atmospheric.

The resultant granular polymer powder was free flowing and had a bulk density of 0.7 g cm$^{-3}$. The potassium content of the polymer was 60 ppm while the diphenyl sulphone content was 0.19% by weight.

Polymer produced from another sample of the milled reaction mixture by washing with water and extraction of the diphenyl sulphone with acetone had a bulk density of only 0.37 g cm$^{-3}$.

EXAMPLE 2

By way of comparison a polyethersulphone was made by polycondensation of the dipotassium salt of 4,4'-dihydroxydiphenyl sulphone with an approximately equimolar amount of 4,4'-dichlorodiphenyl sulphone in diphenyl sulphone. The reaction product, which contained about 35.4% by weight of the polymer of repeat unit

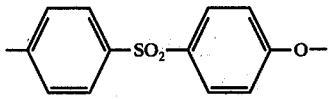

11.4% by weight of potassium chloride and 53.2% by weight of diphenyl sulphone, was cooled and comminuted and washed as in Example 1 to remove the potassium chloride.

The moist solid residue was then subjected to vacuum distillation as in Example 1. The mixture agglomerated at a temperature below 100° C and on raising the temperature to 200° C (below which little or no diphenyl sulphone could be removed) a single phase solution was formed. On raising the temperature to 300° C the diphenyl sulphone was removed only very slowly. The melt gradually became more viscous until it was eventually unworkable.

I claim:

1. A process for the separation of an aromatic etherketone polymer or etherketone/sulphone copolymer containing phenylene groups linked by oxygen atoms and by ketone groups, not more than 25% of the combined total of ketone and sulphone groups being sulphone groups, from the reaction product resulting from the nucleophilic polycondensation of at least one member of the group consisting of i) a mixture of 49–50% molar of at least one alkali metal bisphenate and correspondingly 51–50% molar of at least one dihalo compound, and ii) at least one alkali metal halophenate, in an aromatic sulphone solvent of formula

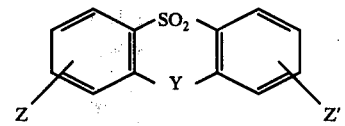

in which Y is a direct link, oxygen or a pair of hydrogen atoms, one attached to each benzene ring, and Z and Z', which may be the same or different, are hydrogen atoms or phenyl groups, comprising cooling the reaction product from the polymerisation temperature until the reaction product has solidified, finely dividing the reaction product, leaching out the alkali metal halide with water and then heating the resultant finely divided material to a temperature of at least 200° C, but below the melting point of the material, under reduced pressure to distil off any remaining water and the aromatic sulphone solvent.

2. A process according to claim 1 wherein the aromatic etherketone polymer or etherketone/sulphone copolymer is made by the nucleophilic polycondensation of at least one member of the group consisting of a) at least one alkali metal halophenate of the formula

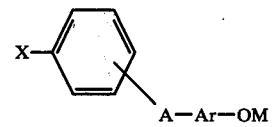

in which Ar is a divalent aromatic radical selected from phenylene, biphenylylene, terphenylylene and radicals of formula

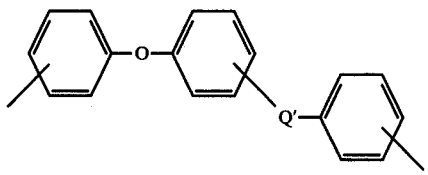

and b) a mixture of 49–50% molar of at least one alkali metal bisphenate of formula

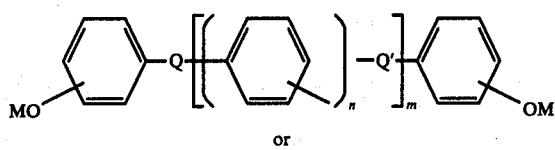

or

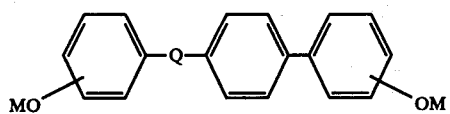

and correspondingly 51-50% molar of at least one dihalo compound of formula

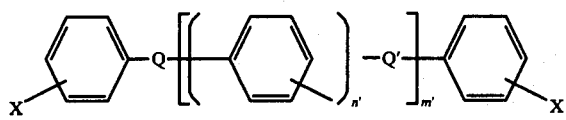

wherein X is halogen and is ortho or para to the groups Q, M is alkali metal and at least 95% of the OM groups are in the para position, Q and Q' are selected from —SO$_2$— or —CO—, at least 75% of the groups Q and Q' being —CO—, $n$ and $n'$ are positive integers not exceeding 3, and $m$ and $m'$ are each 0, 1, 2 or 3.

3. A process according to claim 2 wherein the at least one halophenate is selected from halophenate of the formula

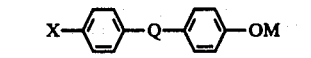

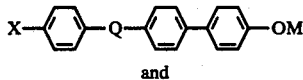

and

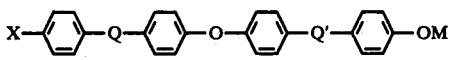

4. A process according to claim 1 wherein the at least one bisphenate is selected from bisphenates of the formula

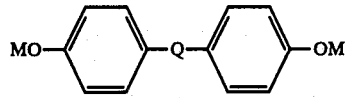

5. A process according to claim 4 wherein the bisphenate has the formula

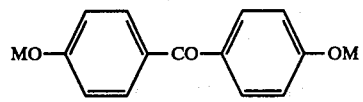

6. A process according to claim 1 wherein the at least one dihalo compound is selected from dihalo compounds of the formula

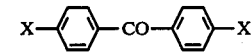

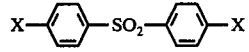

and

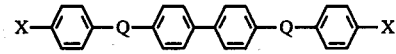

7. A process according to claim 6 wherein the polymer is made by nucleophilic polycondensation of an approximately equimolar mixture of
(i) (a) at least one ketone link containing dihalo compound selected from 1,4-bis-(4-halobenzoyl) benzenes and 4,4'-dihalobenzophenones, alone or in admixture with
(b) a 4,4'-dihalodiphenyl sulphone, and ii) a dialkali metal salt of 4,4'-dihydroxybenzophenone.

8. A process according to claim 1 wherein the aromatic sulphone solvent is diphenyl sulphone.

9. A process according to claim 1 wherein the solidified reaction product is comminuted to a particle size of less than 500 μm prior to leaching out the alkali metal halide.

10. A process according to claim 1 wherein the sulphone solvent is removed by heating to temperatures within the range 200° to 300° C.

11. A process according to claim 1 wherein the aromatic sulphone solvent is removed by distillation under a pressure of 1 to 10 mm of mercury.

* * * * *